US008998508B2

(12) United States Patent
Nealis et al.

(10) Patent No.: US 8,998,508 B2
(45) Date of Patent: Apr. 7, 2015

(54) ALL-OUTDOOR MICROWAVE ENCLOSURE HAVING A BUILT-IN MEMORY CARDHOLDER

(71) Applicant: ZTE (USA) Inc., Richardson, TX (US)

(72) Inventors: Edwin Nealis, Cary, NC (US); Andrey Kochetkov, Cary, NC (US)

(73) Assignee: ZTE (USA) Inc., Richardson, TX (US)

( * ) Notice: Subject to any disclaimer, the term of this patent is extended or adjusted under 35 U.S.C. 154(b) by 303 days.

(21) Appl. No.: 13/645,331

(22) Filed: Oct. 4, 2012

(65) Prior Publication Data

US 2013/0102262 A1 Apr. 25, 2013

Related U.S. Application Data

(60) Provisional application No. 61/549,668, filed on Oct. 20, 2011.

(51) Int. Cl.

| | |
|---|---|
| ***G02B 6/36*** | (2006.01) |
| ***H01Q 1/50*** | (2006.01) |
| ***H01R 27/02*** | (2006.01) |

(52) U.S. Cl.
CPC ............ *H01Q 1/50* (2013.01); *Y10T 29/49117* (2015.01); *H01R 27/02* (2013.01)

(58) Field of Classification Search
None
See application file for complete search history.

(56) References Cited

U.S. PATENT DOCUMENTS

| | | | | |
|---|---|---|---|---|
| 7,043,280 | B1 | 5/2006 | Shields et al. | |
| 7,575,481 | B1 * | 8/2009 | Liu | 439/660 |
| 8,339,792 | B1 * | 12/2012 | Huang et al. | 361/737 |
| 2001/0027131 | A1 * | 10/2001 | Tanaka et al. | 463/43 |
| 2005/0211767 | A1 * | 9/2005 | Sawachi | 235/380 |
| 2007/0019963 | A1 | 1/2007 | Mizue | |
| 2010/0217910 | A1 * | 8/2010 | Bryant-Rich | 710/301 |
| 2011/0211792 | A1 | 9/2011 | Koreeda et al. | |
| 2012/0028508 | A1 * | 2/2012 | Johnston | 439/668 |

FOREIGN PATENT DOCUMENTS

| | | | |
|---|---|---|---|
| AU | 2009100048 | A4 | 3/2009 |
| CN | 101283486 | A | 10/2008 |
| CN | 201887291 | U | 6/2011 |
| JP | H10190803 | A | 7/1998 |
| WO | WO 2011/100633 | A1 | 8/2011 |

OTHER PUBLICATIONS

ZTE (USA) Inc., Communication, EP 12188522.2, May 21, 2013, 7 pgs.

* cited by examiner

*Primary Examiner* — Sung Pak
(74) *Attorney, Agent, or Firm* — Morgan, Lewis & Bockius LLP

(57) ABSTRACT

A microwave transmit/receive enclosure comprises an enclosure housing and one or more I/O connection ports that are mounted on one side of the enclosure housing. The enclosure housing contains a removable communication connector and a removable memory card. Both the removable communication connector and the removable memory card can be inserted into or removed from the enclosure housing via the same I/O connection port.

8 Claims, 11 Drawing Sheets

ALL-OUTDOOR MICROWAVE ENCLOSURE HAVING A BUILT-IN MEMORY CARDHOLDER

This application claims priority under 35 U.S.C. 119(e) to U.S. Provisional Application Ser. No. 61/549,668, filed Oct. 20, 2011 entitled "All-Outdoor Microwave Enclosure Having a Built-In Memory Cardholder." The foregoing application is incorporated by reference in this application in its entirety.

BACKGROUND

Technical Field

Microwave communication systems commonly consist of many outdoor enclosures for housing microwave transmitter/receiver equipment. Each outdoor microwave enclosure has one or more input/output (I/O) connection ports for tributary connection or connection to support the equipment. These I/O connection ports need to be protected from the external environment, e.g., extreme weather conditions. An outdoor microwave communication enclosure often includes a storage device for storing data including licensing information, configuration parameters, software, etc., which data supports the operation of the electronic hardware in the system. Traditionally, it is difficult to extract the data from the hardware in the event of a hardware failure. As a result, the data would have to be stored outside the enclosure's hardware in order to be loaded into a replacement unit. An alternative approach as described in FIG. 2 below is to create a dedicated opening in the enclosure for the storage device. Nevertheless, this additional opening would impose a challenge to the full weatherproof of the enclosure, which is critical to the normal operation the enclosure.

SUMMARY

One objective of the present invention is to provide an enclosure design that allows a technician to insert/remove a storage device into/from an all-outdoor enclosure without requiring any additional opening on the enclosure. By providing access to a removable storage device, the data can be loaded into the storage device and easily removed and reinstalled in another enclosure in the event of hardware failure replacement or hardware upgrade. This approach is more convenient than storing the data external to the microwave enclosure's hardware and provides greater flexibility in data and licensing management.

According to some embodiments, an all-outdoor microwave transmit/receive enclosure comprises an enclosure housing and one or more I/O connection ports that are mounted on one side of the enclosure housing. The enclosure housing contains a removable communication connector and a removable memory card. Both the removable communication connector and the removable memory card can be inserted into or removed from the enclosure housing via a particular I/O connection port.

According to some embodiments, the removable communication connector is an optical transceiver. The optical transceiver may have a standard form-factor selected from the group consisting of CFP, SFF, SFP, SFP+, XFP, and BiDi.

According to some embodiments, the removable communication connector is a passive optical connector.

According to some embodiments, the removable communication connector is an Ethernet connector.

According to some embodiments, the removable memory card is a flash memory card, e.g., a form-factor micro SD card.

According to some embodiments, the removable memory card is configured to store at least one of licensing information, configuration parameters, and software for operating the enclosure.

According to some embodiments, the enclosure housing further contains a printed circuit board adjacent the particular I/O connection port, and a first side of the printed circuit board is attached to a cage for hosting the removable communication connector and a second side opposite the first side of the printed circuit board is attached to a cardholder for hosting the removable memory card.

According to some embodiments, each I/O connection port is configured to be coupled to a respective cable plug-in terminal and the cable plug-in terminal has a weather protection shielding the I/O connection port from the external environment.

According to some embodiments, a method of replacing a first memory card inside a microwave transmit/receive enclosure with a second memory card comprises unplugging a cable plug-in terminal from an I/O connection port of the enclosure, wherein there are a first memory card and a communication connector inside the enclosure and both the first memory card and the communication connector are near the I/O connection port; removing the first memory card from the enclosure through the I/O connection port; inserting a second memory card into the enclosure through the I/O connection port to occupy a space inside the enclosure that used to be occupied by the first memory card; and plugging the cable plug-in terminal back into the I/O connection port.

According to some embodiments, the method further comprises: removing the communication connector from the enclosure through the I/O connection port; and inserting a replacement communication connector into the enclosure through the I/O connection port to occupy a space inside the enclosure that used to be occupied by the removed communication connector.

According to some embodiments, the enclosure includes a printed circuit board adjacent the I/O connection port, and a first side of the printed circuit board is attached to a cage for housing the communication connector and a second side opposite the first side of the printed circuit board is attached to a cardholder for hosting one of the first memory card and the second memory card.

According to some embodiments, the communication connector is an optical transceiver that has a standard form-factor selected from the group consisting of CFP, SFF, SFP, SFP+, XFP, and BiDi.

According to some embodiments, the removable memory card is a flash memory card, e.g., a form-factor micro SD card.

According to some embodiments, the removable memory card is configured to store at least one of licensing information, configuration parameters, and software for operating the enclosure.

According to some embodiments, the I/O connection port is configured to be coupled to the cable plug-in terminal and the cable plug-in terminal has a weather protection shielding the I/O connection port from the external environment.

BRIEF DESCRIPTION OF THE DRAWINGS

Different aspects of the present invention as well as features and advantages thereof will be more clearly understood hereinafter as a result of a detailed description of embodiments of the present invention when taken in conjunction with the accompanying drawings, which are not necessarily drawn to scale. Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous non-limiting specific details are set forth in order to assist in understanding the subject matter presented herein. It will be apparent, however, to one of ordinary skill in the art that various alternatives may be used without departing from the scope of the present invention and the subject matter may be practiced without these specific details. For example, it will be apparent to one of ordinary skill in the art that the subject matter presented herein can be implemented on many types of outdoor radios systems.

Figure 1:
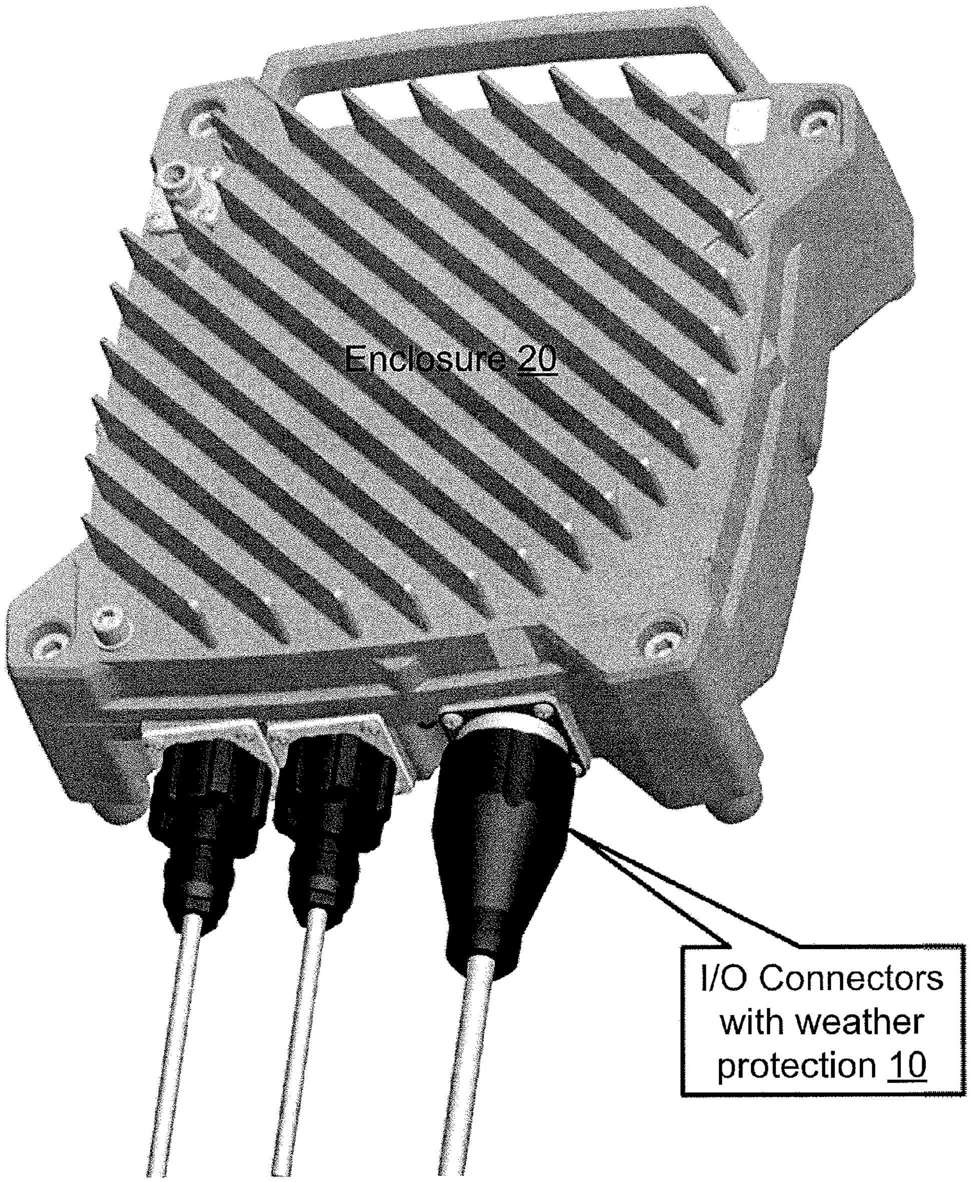
FIG. 1 depicts an outdoor microwave enclosure with I/O connectors having weather protection according to some embodiments.

FIG. 1 depicts an outdoor microwave enclosure 20 with multiple I/O connectors 10, each connector having weather protection according to some embodiments. As described above, the enclosure 20 houses a storage device (e.g., a flash memory card) for storing data such as licensing information, configuration parameters, and software for operating the enclosure 20. The connector types may include Ethernet and fiber optic connections, etc.

Figure 2:
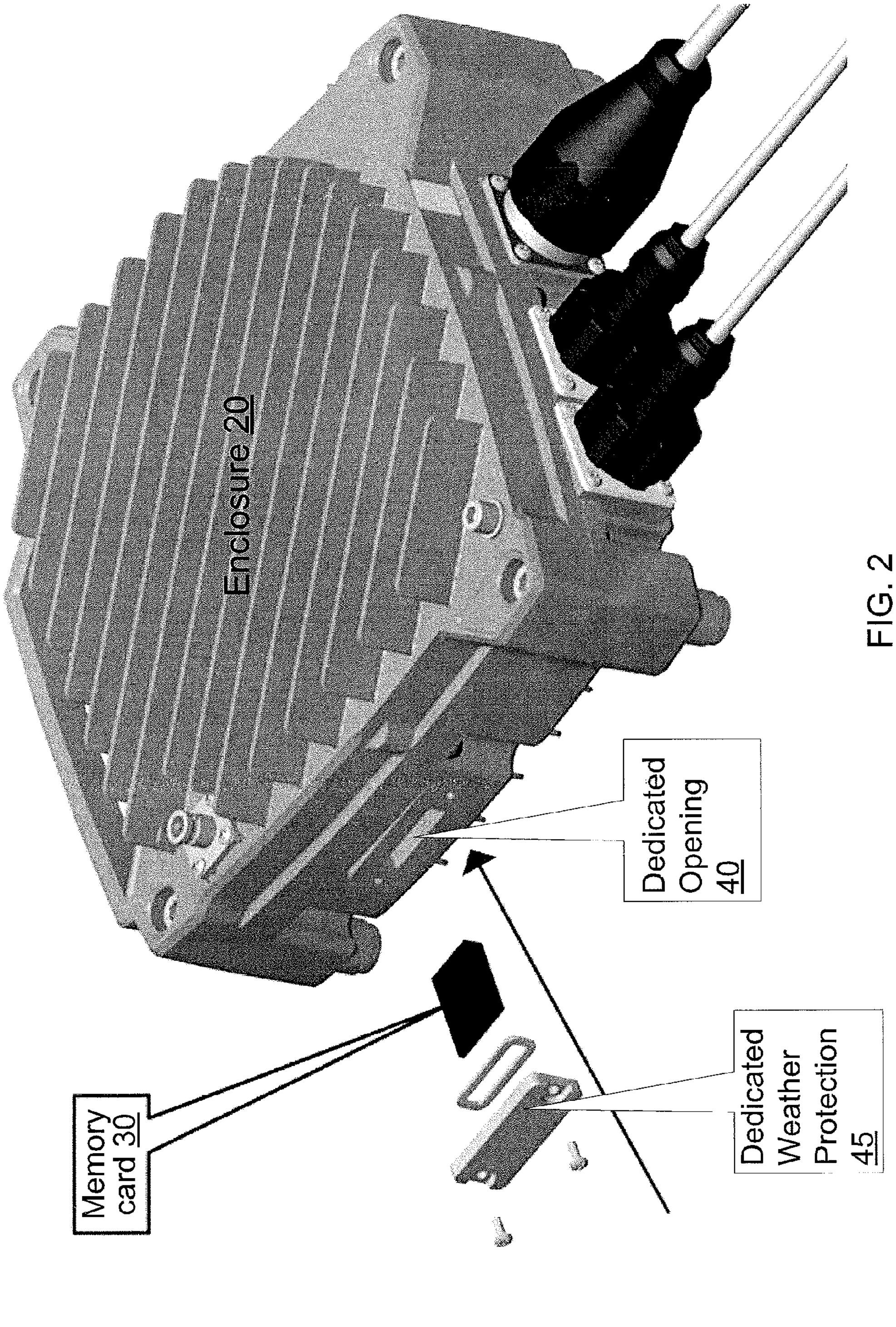
FIG. 2 depicts an outdoor microwave enclosure utilizing a dedicated opening in the enclosure for hosting removable memory card according to some embodiments.

In order to make it easier to replace the memory card, FIG. 2 depicts that there is a dedicated opening 40 in the enclosure 20 for hosting the removable memory card 30 according to some embodiments. But as noted above, this approach would require a dedicated set of weather protection 45 to protect the memory card 30 from extreme weather conditions. For example, beside the memory card 30 and a corresponding memory cardholder inside the enclosure 20 (not shown in the figure) a cover, gasket, and screws are required for this approach.

Figure 3:
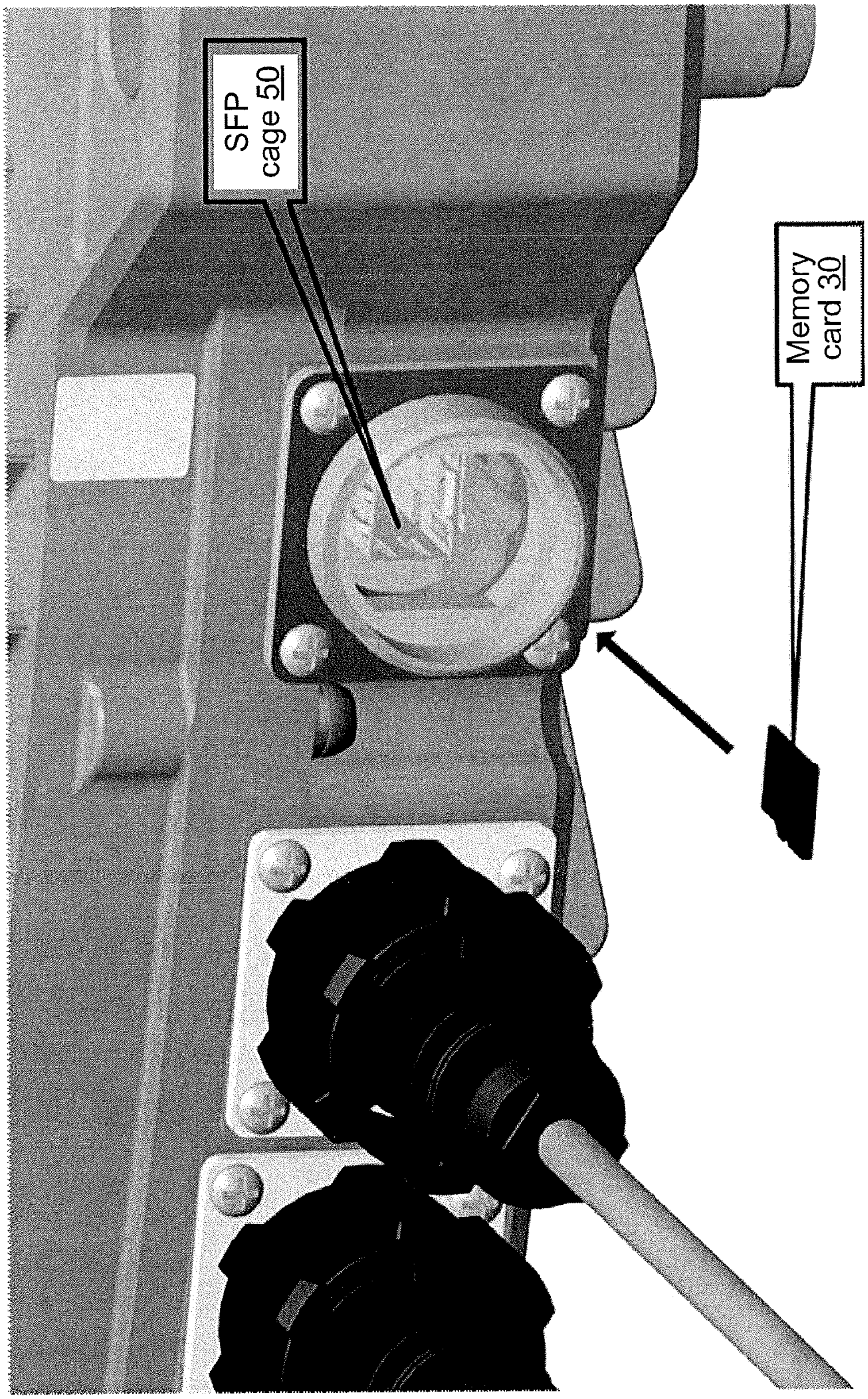
FIG. 3 depicts an outdoor microwave enclosure having an I/O connection port shared by a removable memory card and an optical transceiver according to some embodiments.

FIG. 3 depicts that the outdoor microwave enclosure 20 includes an I/O connection port shared by the removable memory card 30 and an optical transceiver according to some embodiments. In this example, the memory card 30 shares the I/O connection port hosting an optical transceiver (e.g., an SFP transceiver). As shown in the figure, there is an SFP cage 50 inside the I/O connection port. The memory card 30 can be inserted into the enclosure 20 through the I/O connection port after the I/O connector is removed. It should be noted that the I/O connection port may be used for hosting other types of optical transceivers having a different form-factor standard, e.g., CFP, SFF, SFP, SFP+, XFP, and BiDi. Moreover, the I/O connection port may be used for hosting other types of communication connectors such as passive optical connectors, Ethernet connectors, etc. The flash memory card may have a standard form-factor, e.g., a micro SD card. One requirement for the I/O connection port is that it is large enough to have additional space for allowing the memory card to be plugged into a corresponding memory cardholder inside the enclosure 20 without causing substantial interference to the other existing I/O connectors. This approach does not require any change to the geometrical dimensions of the current design of an enclosure housing.

Figure 4:
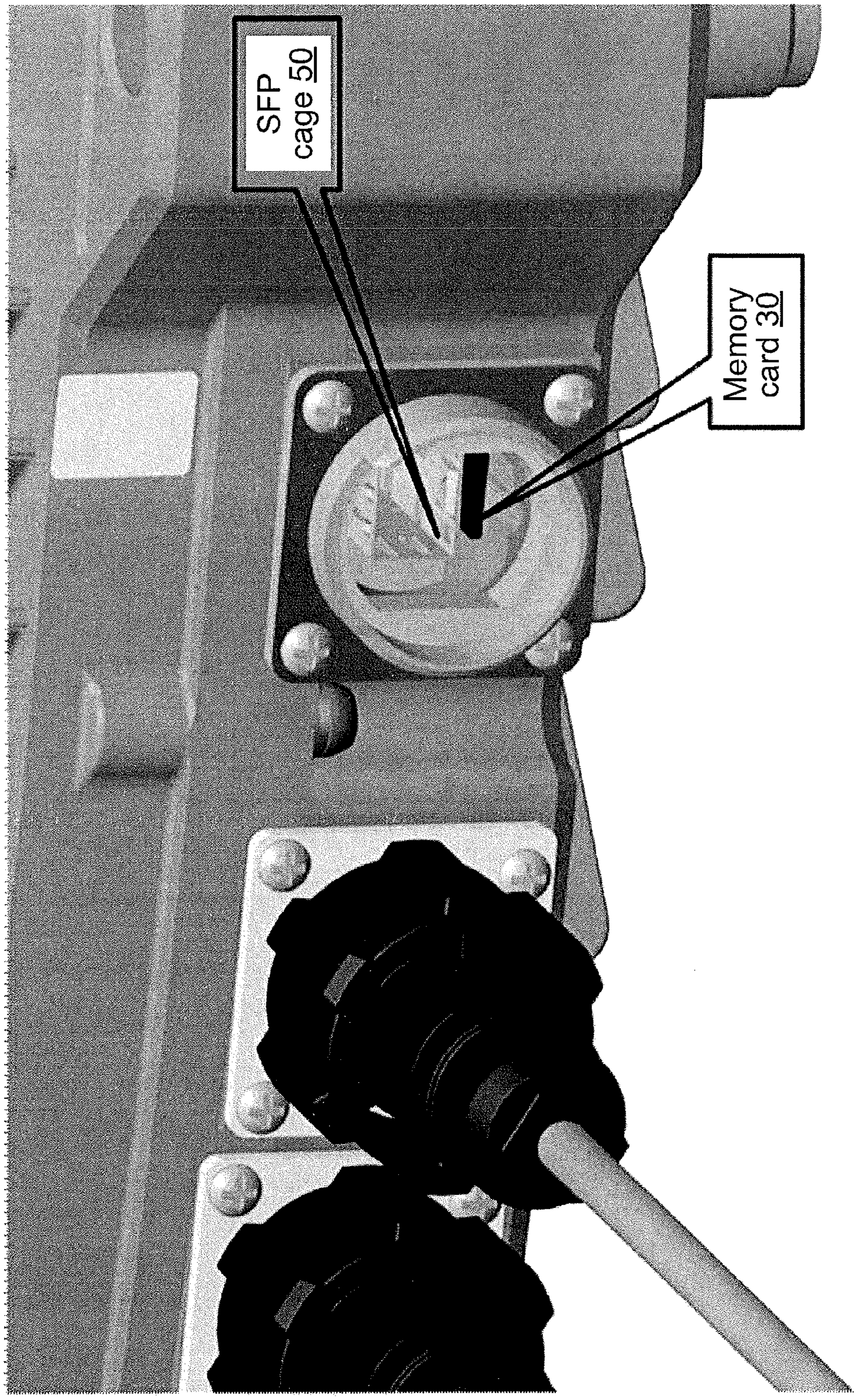
FIG. 4 depicts that the memory card is installed in the I/O connection port according to some embodiments.

FIG. 4 depicts that the memory card 30 is installed inside the I/O connection port according to some embodiments. Note that the SFP cage 50 is still empty because the transceiver has not been plugged into the cage.

Figure 5:
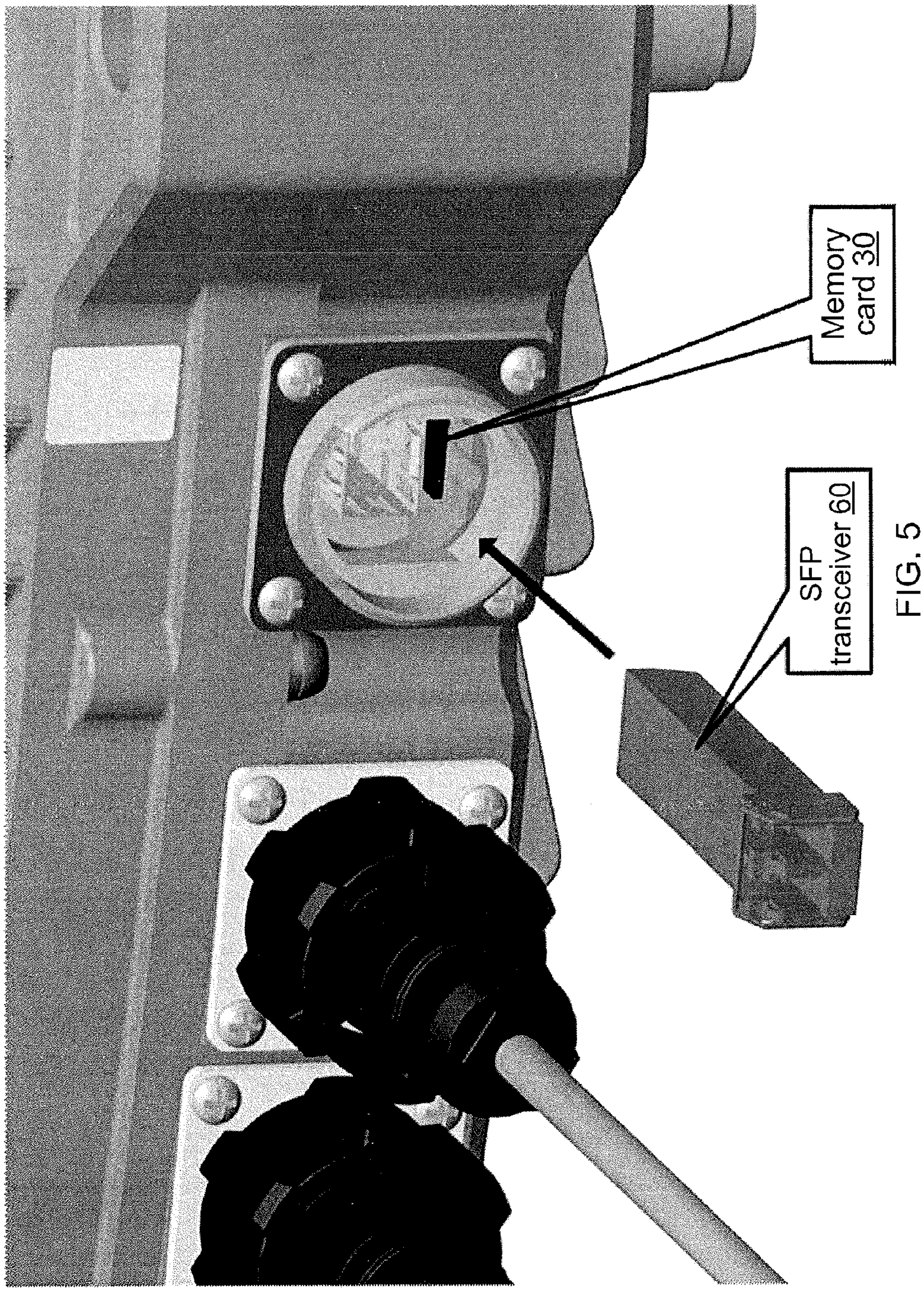
FIG. 5 depicts that an SFP (Small Form-factor Pluggable) transceiver is being inserted into the I/O connection port according to some embodiments.

FIG. 5 depicts that an SFP transceiver 60 is being inserted into the I/O connection port according to some embodiments.

Figure 6:
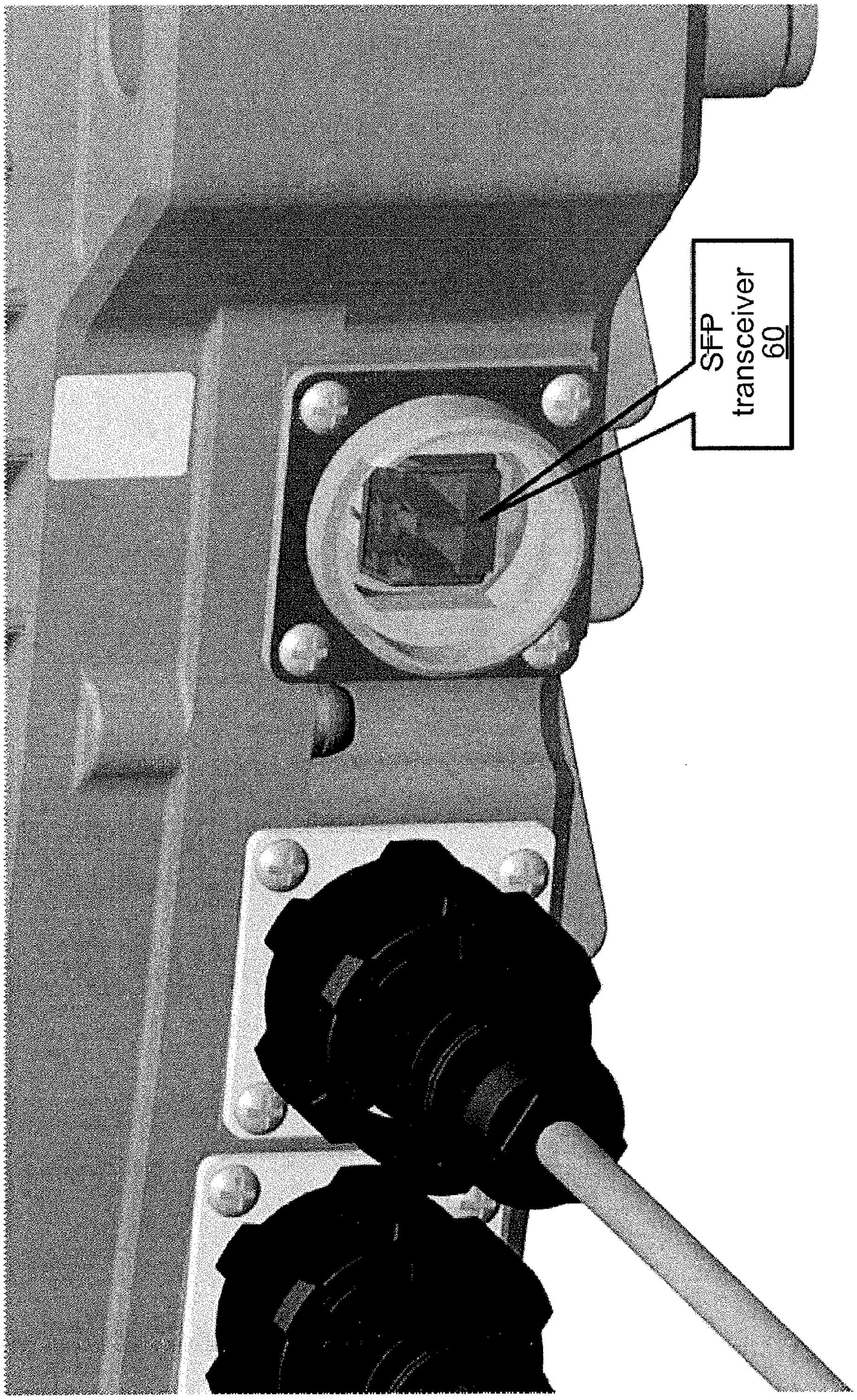
FIG. 6 depicts that the SFP transceiver is installed in the I/O connection port according to some embodiments.
Figure 7:
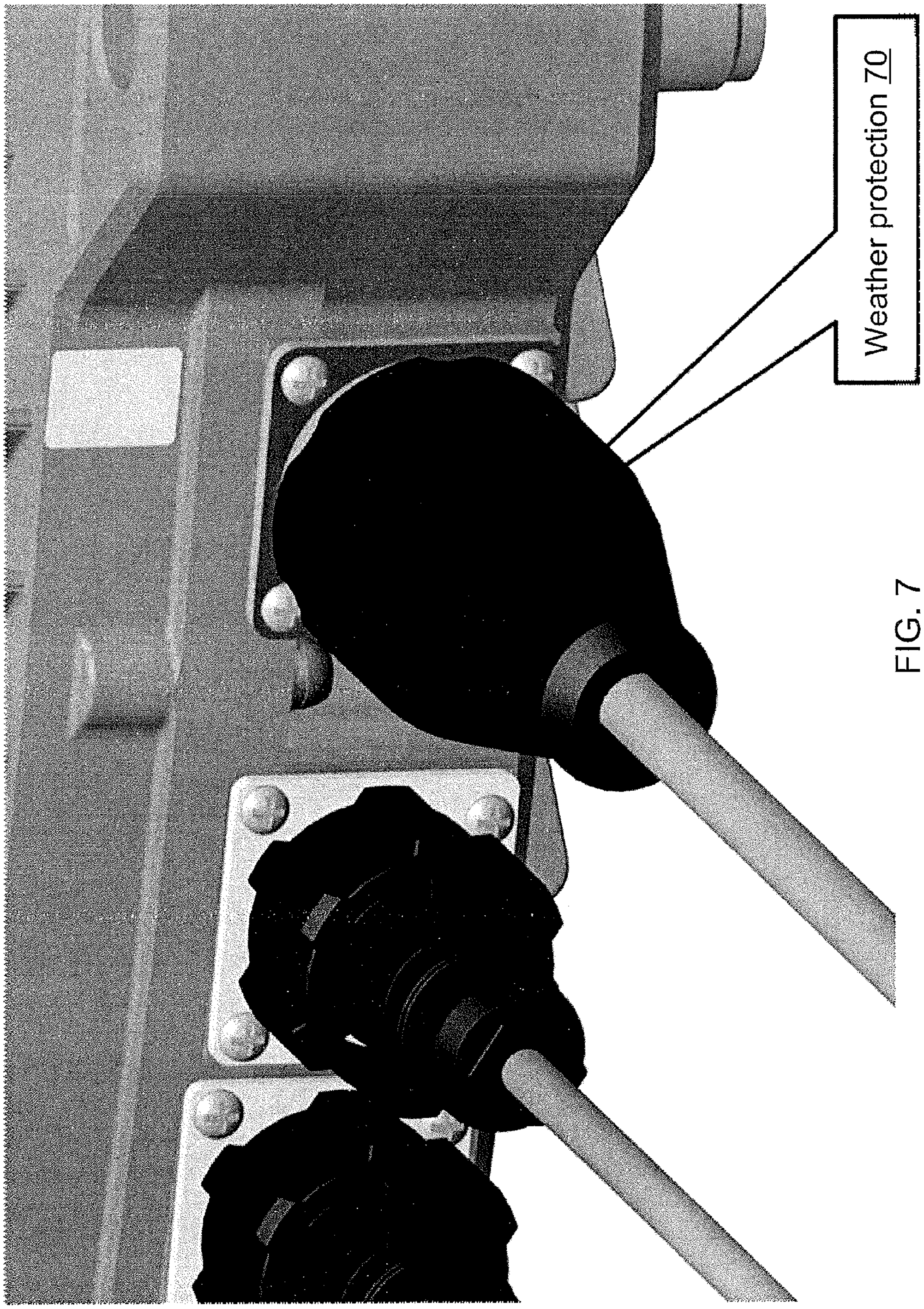
FIG. 7 depicts that the I/O connector with weather protection is installed back on the enclosure according to some embodiments.

FIG. 6 depicts that the SFP transceiver 60 has been installed inside the enclosure through the I/O connection port according to some embodiments. Assuming that the newly-inserted memory card 30 (e.g., a new memory card that is used to replace an existing memory card having the same form-factor standard) has the information for upgrading the operation of the enclosure, the technician can now plug back the previously removed I/O connector with weather protection 70 as shown in FIG. 7. As noted above, the memory card 30 should be located inside the enclosure 20 in such a way that it is easy to be inserted into or removed from the enclosure 20. Additionally, the memory card's existence should not interference the normal operation of the I/O connector as well as the communication connector inside the enclosure 20 that shares the I/O connection port with the memory card 30.

FIGS. 3-7 depict, respectively an outdoor microwave enclosure 20 utilizing some embodiments of the present invention. In FIG. 3, the connector weather protection is removed to reveal the connection details. In this case, the connection is an SFP optical transceiver but the connection could be a passive fiber optic connector, Ethernet connector, or other connector type. FIG. 3 shows how the memory card 30 is removed and installed through the same I/O connection port as the SFP transceiver 60. FIG. 4 shows how the memory card 30 is installed into the memory cardholder 90 located below the sheet metal cage 50 that houses the SFP transceiver 60. FIG. 5 shows how the SFP transceiver 60, in this case with a duplex LC fiber optic connector, is installed into the SFP cage 50. FIG. 6 shows that both the SFP transceiver 60 and the memory card 30 have been appropriately installed. The duplex LC fiber optic connector is plugged into the SFP transceiver 60 and the weather protection is installed back as shown in FIG. 7.

Figure 8:
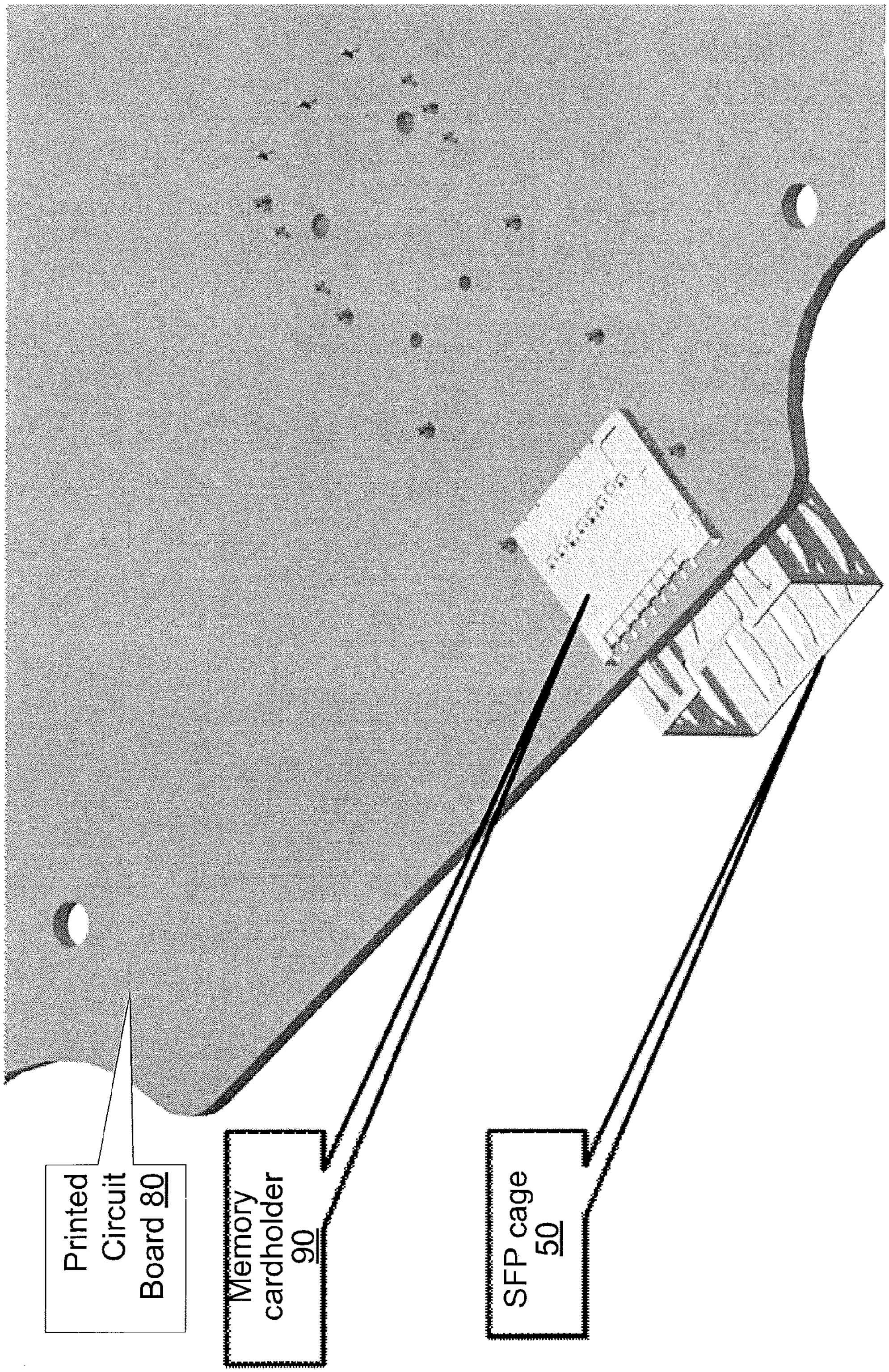
FIG. 8 depicts a printed circuit card inside the enclosure with an SFP cage and a memory cardholder attached to two opposite sides of the board according to some embodiments.
Figure 9:
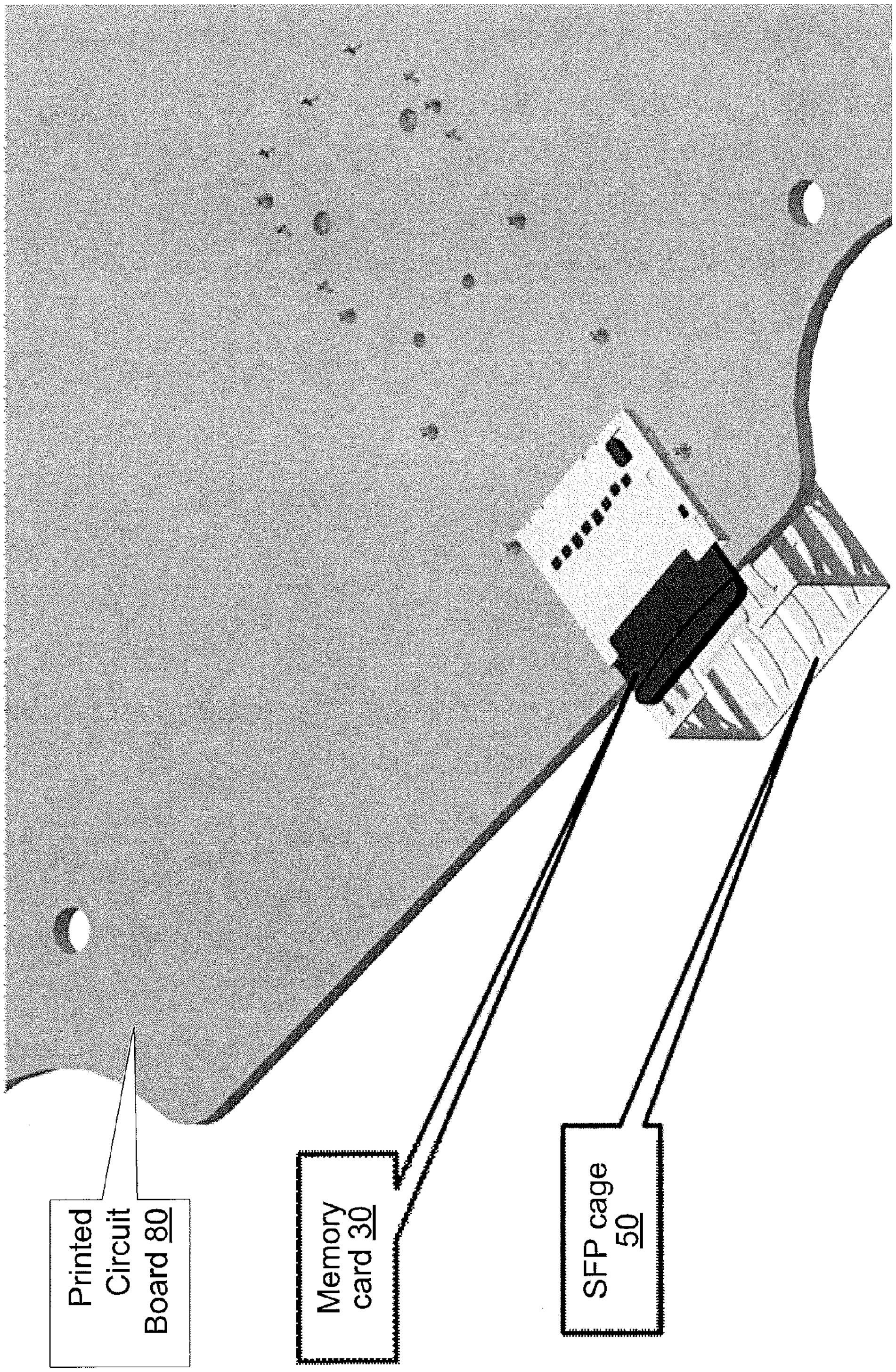
FIG. 9 depicts that the memory card is inserted into the memory cardholder according to some embodiments.

As shown in FIG. 8, the memory card 30 is housed by a memory cardholder 90 that is located at the opposite side of a printed circuit board 80 that is attached to the SFP cage 50. As such, the two components, the SFP transceiver 60 and the memory card 30 can co-exist without affecting the other one. This configuration may require a new design of the printed circuit board 80 in order for other components in the enclosure 20 to access the data stored in the memory card through the printed circuit board 80. FIG. 9 depicts that the memory card 30 is inserted into the memory cardholder 90 according to some embodiments.

FIGS. 8 and 9 depict, respectively, a close-up of the printed circuit board 80 housed within the enclosure 20. The SFP cage 50 is on one side of the board 80 and the memory cardholder 90 is on the other side. Both the SFP cage 50 and the memory cardholder 90 can be accessed through a single opening in the enclosure that is weather sealed using a single weather protection component.

Figure 10:
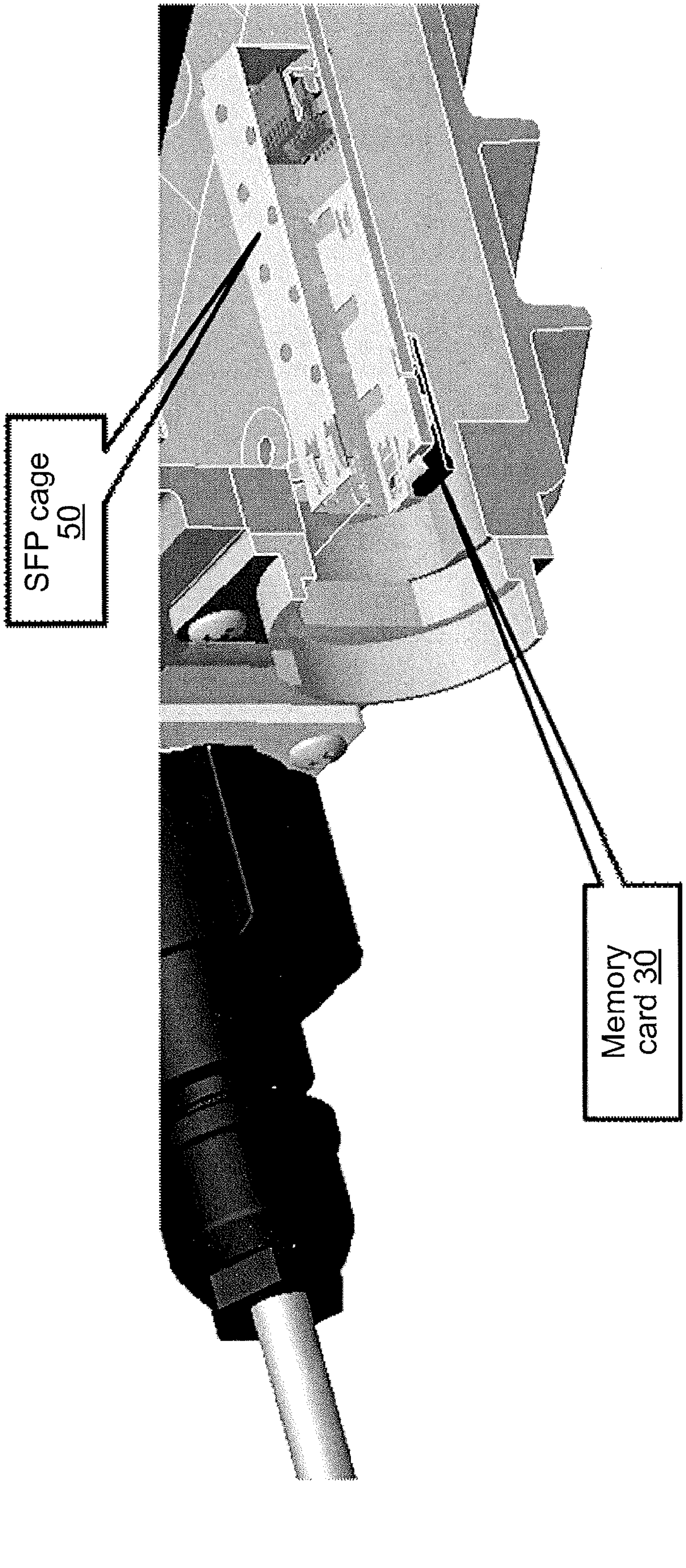
FIG. 10 depicts a cross-sectional view of the enclosure with the connector's weather protection removed and the SFP transceiver removed but the memory card installed according to some embodiments.
Figure 11:
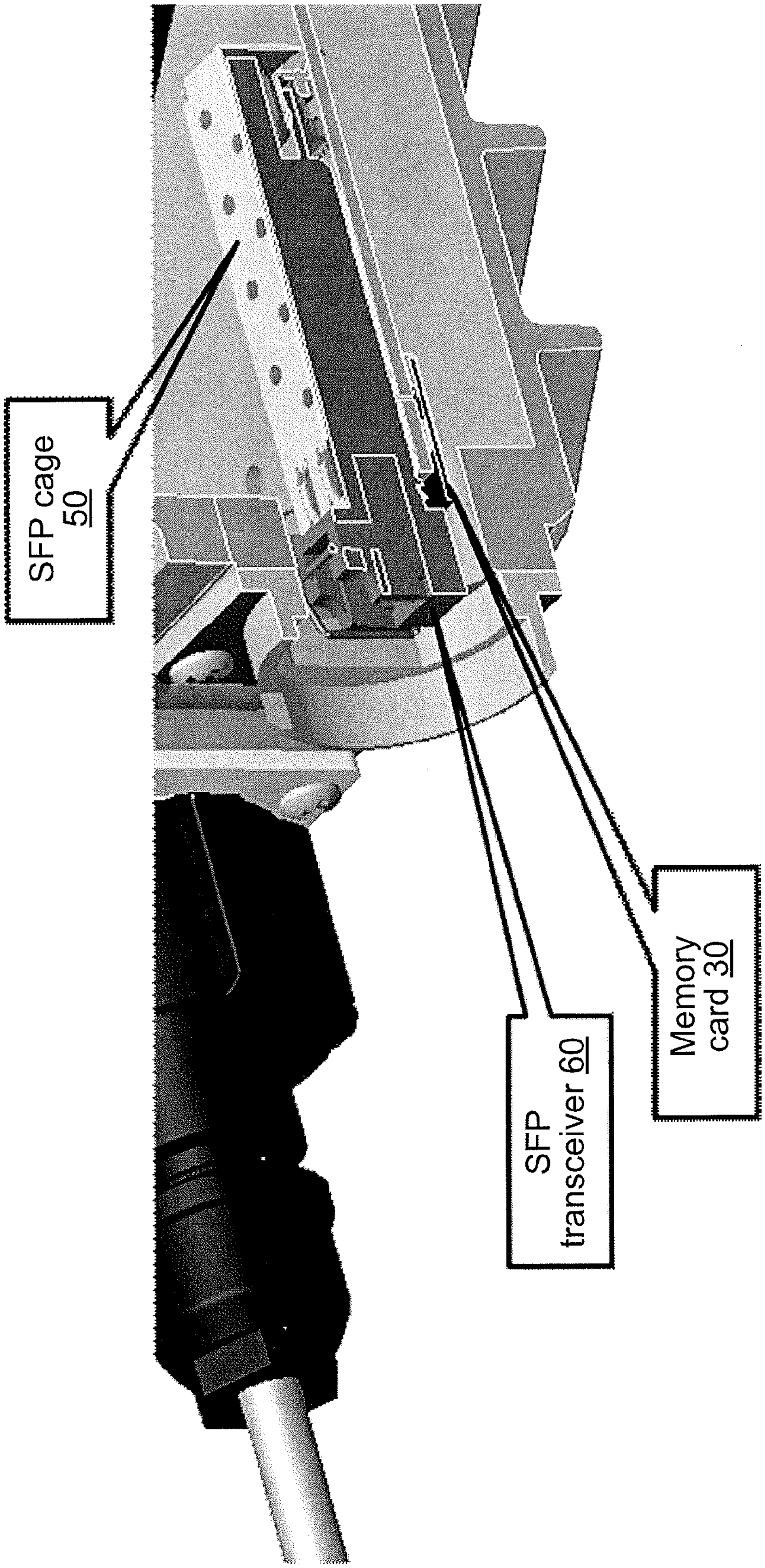
FIG. 11 depicts a cross-sectional view of the enclosure with the connector protection removed but both the SFP transceiver and the memory card install according to some embodiments.

FIG. 10 depicts a cross-sectional view of the enclosure with the connector's weather protection removed and the SFP transceiver removed but the memory card installed according to some embodiments. FIG. 11 depicts a cross-sectional view of the enclosure with the connector protection removed but both the SFP transceiver and the memory card install according to some embodiments. These two cross-sectional views provide further detail of the arrangement of the SFP cage 50, the memory cardholder 90, the SFP transceiver 60, and the memory card 30 inside the microwave enclosure.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

We claim:

1. A method of replacing a first memory card inside a microwave transmit/receive enclosure with a second memory card, comprising:

unplugging a cable plug-in terminal from an I/O connection port of the enclosure, wherein there are a first memory card and a communication connector inside the enclosure and both the first memory card and the communication connector are near the I/O connection port;

removing the first memory card from the enclosure through the I/O connection port;

inserting a second memory card into the enclosure through the I/O connection port to occupy a space inside the enclosure that used to be occupied by the first memory card; and plugging the cable plug-in terminal back into the I/O connection port.

2. The method of claim 1, further comprising:

removing the communication connector from the enclosure through the I/O connection port; and inserting a replacement communication connector into the enclosure through the I/O connection port to occupy a space inside the enclosure that used to be occupied by the removed communication connector.

3. The method of claim 1, wherein the enclosure includes a printed circuit board adjacent the I/O connection port, and a first side of the printed circuit board is attached to a cage for housing the communication connector and a second side opposite the first side of the printed circuit board is attached to a cardholder for hosting one of the first memory card and the second memory card.

4. The method of claim 1, wherein the communication connector is an optical transceiver that has a standard form-factor selected from the group consisting of CFP, SFF, SFP, SFP+, XFP, and BiDi.

5. The method of claim 1, wherein the removable memory card is a flash memory card.

6. The method of claim 5, wherein the flash memory card is a form-factor micro SD card.

7. The method of claim 1, wherein the removable memory card is configured to store at least one of licensing information, configuration parameters, and software for operating the enclosure.

8. The method of claim 1, wherein the I/O connection port is configured to be coupled to the cable plug-in terminal and the cable plug-in terminal has a weather protection shielding the I/O connection port from the external environment.

* * * * *